United States Patent
Ro (10) Patent No.: US 9,041,359 B2
(45) Date of Patent: May 26, 2015

(54) BATTERY PACK WITH INTEGRAL NON-CONTACT DISCHARGING MEANS AND ELECTRONIC DEVICE INCLUDING THE SAME

(75) Inventor: Hun-Tae Ro, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 472 days.

(21) Appl. No.: 13/396,557

(22) Filed: Feb. 14, 2012

(65) Prior Publication Data

US 2012/0229092 A1  Sep. 13, 2012

Related U.S. Application Data

(60) Provisional application No. 61/451,508, filed on Mar. 10, 2011.

(51) Int. Cl.
*H02J 7/00* (2006.01)
*H02J 7/02* (2006.01)

(52) U.S. Cl.
CPC ............... *H02J 7/0065* (2013.01); *H02J 7/025* (2013.01)

(58) Field of Classification Search
CPC ............................... H02J 7/025; H02J 7/0065
USPC .......................... 320/112, 108, 107, 135, 136
See application file for complete search history.

(56) References Cited

U.S. PATENT DOCUMENTS

| | | | |
|---|---|---|---|
| 6,844,702 B2 * | 1/2005 | Giannopoulos et al. ....... | 320/108 |
| 7,375,493 B2 * | 5/2008 | Calhoon et al. ............... | 320/108 |
| 7,378,817 B2 * | 5/2008 | Calhoon et al. ............... | 320/108 |
| 7,791,312 B2 * | 9/2010 | Kook .............................. | 320/108 |
| 2005/0134213 A1 | 6/2005 | Takagi et al. | |
| 2009/0106567 A1 | 4/2009 | Baarman | |
| 2011/0084658 A1 * | 4/2011 | Yamamoto et al. ........... | 320/108 |

FOREIGN PATENT DOCUMENTS

| | | |
|---|---|---|
| JP | 1999-289679 A | 10/1999 |
| JP | 2005-143181 A | 6/2005 |
| JP | 2008-005573 | 1/2008 |
| JP | 2008-172937 | 7/2008 |
| JP | 2008-263779 | 10/2008 |
| JP | 2010-022076 | 1/2010 |
| KR | 10-0727002 B1 | 6/2007 |

OTHER PUBLICATIONS

English Machine Translation of JP 2008-263779, published Oct. 30, 2008, 29 pages.
English Machine Translation of JP 2008-172937, published Jul. 24, 2008, 12 pages.

(Continued)

*Primary Examiner* — Richard V Muralidar
(74) *Attorney, Agent, or Firm* — Christie, Parker & Hale, LLP (57) ABSTRACT

A battery pack and an electronic device are disclosed. The battery pack includes a battery for storing electric energy, and a non-contacting discharging unit for receiving the stored electric energy from the battery and for transferring the stored electric energy to a power receiving unit in a non-electrically contacting manner. The electronic device includes a main body and the battery pack. The main body includes a power receiving unit. The battery pack is for mounting to and supplying power to the main body.

16 Claims, 9 Drawing Sheets

(56) References Cited

OTHER PUBLICATIONS

KIPO Office action dated Apr. 22, 2013, for corresponding Korean Patent application 10-2012-0016470, (10 pages).
Patent Abstracts of Japan, and English machine translation of Japanese Publication 2008-005573, dated Jan. 10, 2008, (27 pages).
Patent Abstracts of Japan, and English machine translation of Japanese Publication 2010-022076, dated Jan. 28, 2010, (23 pages).
KIPO Office action dated Oct. 30, 2013, for corresponding Korean Patent application 10-2012-0016470, (6 pages).
English Machine Translation of JP 1999-289679, published Oct. 19, 1999, 21 pages.

* cited by examiner

BATTERY PACK WITH INTEGRAL NON-CONTACT DISCHARGING MEANS AND ELECTRONIC DEVICE INCLUDING THE SAME

CROSS-REFERENCE TO RELATED APPLICATIONS

This application claims priority to and the benefit of U.S. Provisional Application No. 61/451,508, filed on Mar. 10, 2011, in the United States Patent and Trademark Office, the entire content of which is incorporated herein by reference.

BACKGROUND

1. Field

Aspects of embodiments of the present invention are directed toward a battery pack and an electronic device including the battery pack.

2. Description of the Related Art

Increasing use of portable electronic devices, for example, mobile phones, digital cameras, or notebooks, has led to active development of batteries as a power supply source for driving the portable electronic devices. In general, a battery is provided in the form of a battery pack together with a plurality of battery cells and a protection circuit for controlling charging and discharging of the battery cells. The battery pack is mounted in a main body of an electronic device and supplies power stored in the battery to the main body of the electronic device. In this regard, an externally exposed terminal of the battery pack is connected to a terminal installed in the main body of the electronic device so that power is supplied to the main body of the electronic device through the terminal.

SUMMARY

Aspects of embodiments of the present invention are directed toward a battery pack capable of non-contact discharging and an electronic device including the battery pack. According to one or more embodiments of the present invention, a battery pack capable of non-contact discharging and an electronic device including the battery pack are provided.

In an exemplary embodiment according to the present invention, a battery pack is provided. The battery pack includes a battery for storing electric energy, and a non-contacting discharging unit for receiving the stored electric energy from the battery and for transferring the stored electric energy to a power receiving unit in a non-electrically contacting manner.

The battery pack may further include a feedback receiving unit for receiving feedback from a feedback transmitting unit in a non-electrically contacting manner. The feedback may be for controlling a rate of transfer of the stored electric energy.

The feedback receiving unit may include a light receiving sensor or a current inducing unit.

The battery pack may further include a connection detecting unit for detecting a connection between the non-contacting discharging unit and the power receiving unit.

The connection detecting unit may include a magnetic sensor, a pressure sensor, or a button.

The non-contacting discharging unit may include a magnetic field generating unit for generating a magnetic field.

The non-contacting discharging unit may further include a pulse generating unit for controlling an intensity of the magnetic field by pulse width modulation.

The non-contacting discharging unit may further include an alternating current (AC) generating unit for controlling an intensity of the magnetic field by AC frequency modulation.

The non-contacting discharging unit may be further configured to transfer electric energy from a charging device to the battery. The magnetic field generating unit may be further configured to receive the electric energy from the charging device in a non-electrically contacting manner.

The non-contacting discharging unit may further include a refining unit and a filtering unit. The magnetic field generating unit may be further configured to induce an electric current. The refining unit may be configured to refine the induced current. The filtering unit may be configured to filter the refined current and charge the battery with the filtered current.

The battery pack may further include a non-contacting charging unit for transferring electric energy from a charging device to the battery. The non-contacting charging unit may be configured to receive the electric energy from the charging device in a non-electrically contacting manner.

The battery pack may further include a refining unit and a filtering unit. The non-contacting charging unit may be configured to generate an alternating current.

The refining unit may be configured to refine the alternating current and convert the refined alternating current to a direct current. The filtering unit may be configured to filter the direct current and charge the battery with the filtered direct current.

The battery pack may be electrically insulated from the power receiving unit when the battery pack is configured to transfer the stored electric energy to the power receiving unit.

According to another exemplary embodiment according to the present invention, an electronic device is provided. The electronic device includes a main body and a battery pack. The main body includes a power receiving unit. The battery pack is for mounting to and supplying power to the main body. The battery pack includes a battery for storing electric energy, and a non-contacting discharging unit for receiving the stored electric energy from the battery and transferring the stored electric energy to the power receiving unit in a non-electrically contacting manner.

The main body may further include a feedback transmitting unit. The battery pack may further include a feedback receiving unit for receiving feedback from the feedback transmitting unit in a non-electrically contacting manner. The feedback may be for controlling a rate of transfer of the stored electric energy.

The battery pack may further include a connection detecting unit for detecting a mounting of the battery pack to the main body.

The battery pack may further include a non-contacting charging unit for transferring electric energy from a charging device to the battery. The non-contacting charging unit may be configured to receive the electric energy from the charging device in a non-electrically contacting manner. The power receiving unit may be configured to receive the electric energy from the charging device in a non-electrically contacting manner to power the main body.

The non-contacting discharging unit may be further configured to receive electric energy from a charging device in a non-electrically contacting manner, and to transfer the electric energy from the charging device to the battery.

DETAILED DESCRIPTION

While exemplary embodiments are capable of various modifications and alternative forms, embodiments thereof are shown by way of example in the drawings and will herein be described in more detail. It should be understood, however, that there is no intent to limit exemplary embodiments to the forms disclosed, but on the contrary, exemplary embodiments are to cover all modifications, equivalents, and alternatives falling within the scope of the present invention. When it is determined that detailed descriptions of the related known art may obscure the scope of the present invention, the detailed descriptions will be omitted.

Hereinafter, exemplary embodiments of the present invention will now be described more fully with reference to the accompanying drawings, in which exemplary embodiments of the present invention are shown. Like or corresponding reference numerals in the drawings denote like elements, and thus their descriptions may not be repeated.

Figure 1:
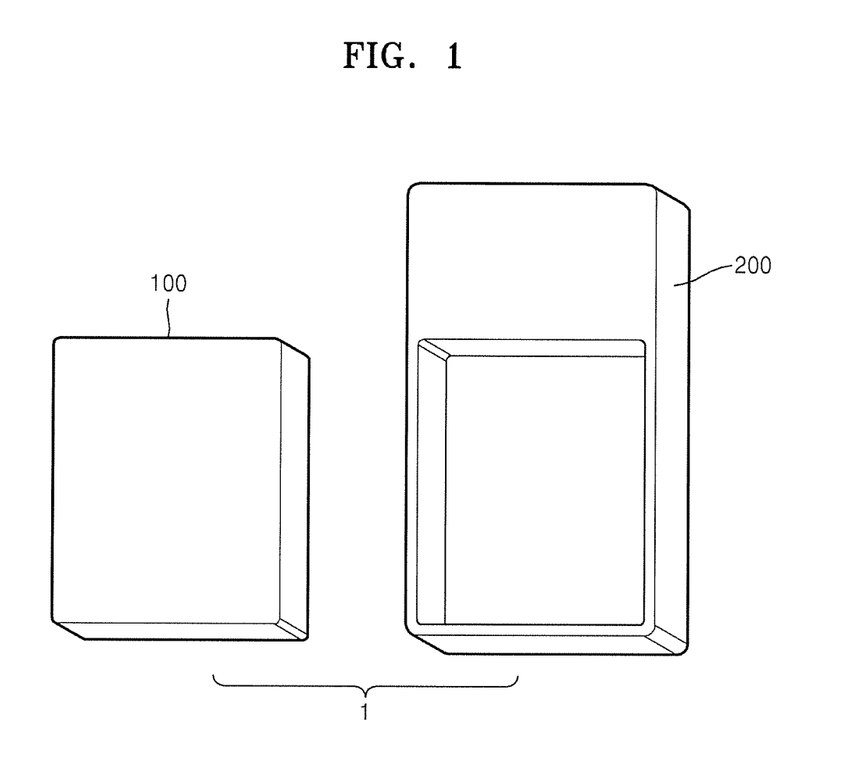
FIG. 1 illustrates an electronic device according to an embodiment of the present invention.

FIG. 1 illustrates an electronic device 1 according to an embodiment of the present invention.

Referring to FIG. 1, the electronic device 1 includes a battery pack 100 and a main body 200. The battery pack 100 includes chargeable/dischargeable secondary batteries for storing electric energy. The batteries may be charged by a charger. The battery pack 100 supplies power to the main body 200 in a non-contacting manner (that is, a non-electrically contacting manner). In other words, the battery pack 100 supplies power to the main body 200 without a transfer or flow of electrons from the battery pack 100 to the main body 200 (e.g., without a metal-to-metal contact). The main body 200 receives power from the battery pack 100 in a non-contacting manner and uses the power to operate the electronic device 1. The battery pack 100 and the main body 200 do not include power supply terminals that are externally exposed and that are connected to each other in a contacting manner in order to supply the power of the battery pack 100 to the main body 200. Various embodiments of the battery pack 100 and the main body 200 are described below.

Figure 2:
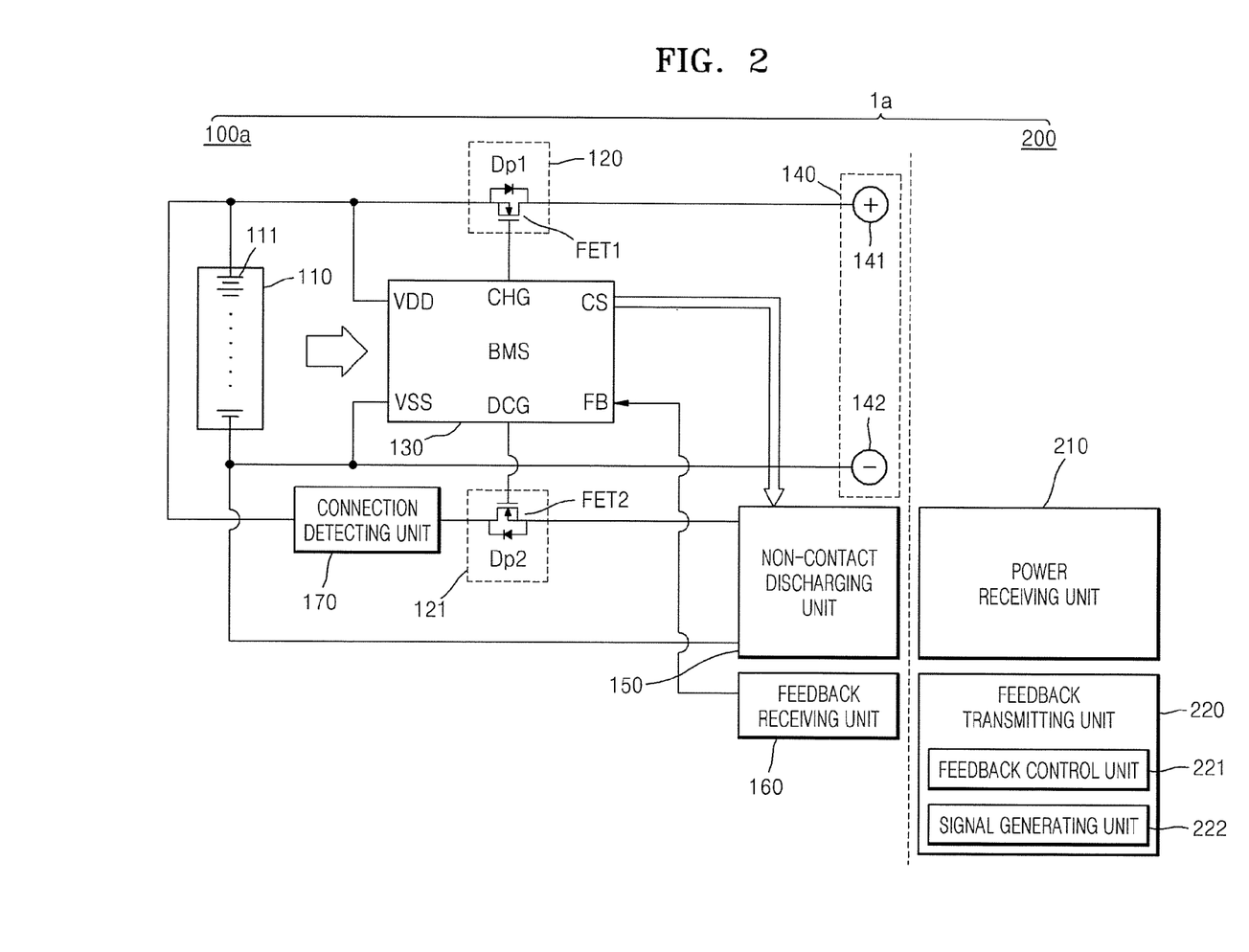
FIG. 2 is a circuit diagram of an electronic device according to an embodiment of the present invention.

FIG. 2 is a circuit diagram of an electronic device 1a according to an embodiment of the present invention.

Referring to FIG. 2, the electronic device 1a includes a battery pack 100a and the main body 200. The battery pack 100a includes a battery 110, a charging control switch 120, a discharging control switch 121, a battery management system (BMS) 130, a terminal unit 140, a non-contact discharging unit 150, a feedback receiving unit 160, and a connection detecting unit 170.

The battery 110 supplies electric power stored therein to the main body 200 of the electronic device 1a on which the battery pack 100a is mounted. If a charger is connected to the battery pack 100a, the battery 110 may be charged with external electric power. The battery 110 includes at least one battery cell 111. The battery cell 111 may be a chargeable/dischargeable secondary battery, such as a nickel-cadmium battery, a lead storage battery, a nickel metal hydride battery (NiMH), a lithium ion battery, or a lithium polymer battery.

If the battery pack 100a malfunctions, the charging control switch 120 blocks a charging current under control of the BMS 130. If the battery pack 100a malfunctions, the discharging control switch 121 blocks a discharging current under control of the BMS 130.

The charging control switch 120 includes a first field effect transistor FET1 and a first parasitic diode Dp1. The first field effect transistor FET1 is connected such that a current flowing from a positive terminal 141 to the battery 110 or from the battery 110 to a negative terminal 142 is controlled. That is, the first field effect transistor FET1 is used to block flow of a charging current. In this regard, the first field effect transistor FET1 is formed such that a discharging current flows through the first parasitic diode Dp1.

The discharging control switch 121 includes a second field effect transistor FET2 and a second parasitic diode Dp2. The second field effect transistor FET2 is connected such that a current flowing from the negative terminal 142 to the battery 110 or from the battery 110 to the positive terminal 141 is controlled. That is, the second field effect transistor FET2 is used to block flow of a discharging current. The second field effect transistor FET2 is formed such that a charging current flows through the second parasitic diode Dp2.

The charging control switch 120 and the discharging control switch 121 are switching devices and are not limited to those used in a field effect transistor. For example, the charging control switch 120 and the discharging control switch 121 may be any one of various devices that perform a switching function.

The BMS 130 may control charging and discharging of the battery 110 and may perform cell balancing control on the battery cell 111 included in the battery 110. In the embodiment of FIG. 2, the BMS 130 includes a power source terminal VDD to which a power voltage is applied, a ground terminal VSS to which a ground voltage is applied, a charging control terminal CHG, a discharging control terminal DCG, a discharging switching terminal CS, a feedback terminal FB, etc.

If the battery pack 100a malfunctions, the BMS 130 generates a charging control signal for controlling on/off operations of the charging control switch 120 or a discharging control signal for controlling on/off operations of the discharging control switch 121. The charging control signal and the discharging control signal are applied to the charging control switch 120 and the discharging control switch 121 through the charging control terminal CHG and the discharging control terminal DCG, respectively.

The BMS 130 applies the discharging switching signal to the non-contact discharging unit 150 through the discharging switching terminal CS. The discharging switching signal controls on/off operations of at least one switching device included in the non-contact discharging unit 150. Although one discharging switching terminal CS is shown in the present embodiment of FIG. 2, this is exemplary for convenience of description. The number of discharging switching terminals CS can vary according to the number of switching devices included in the non-contact discharging unit 150.

The BMS 130 receives a feedback signal from the feedback receiving unit 160 through the feedback terminal FB. The feedback signal may include information regarding a status in which the non-contact discharging unit 150 supplies electric power to a power receiving unit 210. The BMS 130 may perform a feedback operation by adjusting a discharging switching signal according to the feedback signal and applying the adjusted discharging switching signal to the non-contact discharging unit 150.

Further, the BMS 130 may include at least one voltage measurement terminal for measuring a voltage of the battery cell 111 to control the battery pack 100*a*. Although the BMS 130 controls all elements of the battery pack 100*a* in FIG. 1, the structure of the BMS 130 is not limited thereto. For example, the battery pack 100*a* may further include an analog front end for monitoring the state of the battery 110 and controlling operations of the charging control switch 120 and the discharging control switch 121, and in this case, the BMS 130 may control the analog front end.

The terminal unit 140 is connected to a charging device and receives electric power therefrom. The electric power supplied from the charging device may be used to charge the battery 110. In other embodiments, the electric power supplied from the charging device may be supplied to the main body 200 through the non-contact discharging unit 150. As illustrated in the embodiment of FIG. 2, the terminal unit 140 includes the positive terminal 141 and the negative terminal 142. If the charging device is connected to the terminal unit 140, a charging current enters through the positive terminal 141, and a charging current flows out through the negative terminal 142.

The non-contact discharging unit 150 supplies the electric power stored in the battery 110 to the main body 200 through non-contact discharging. Embodiments of the non-contact discharging unit 150 will be in more detail described below.

Figure 3:
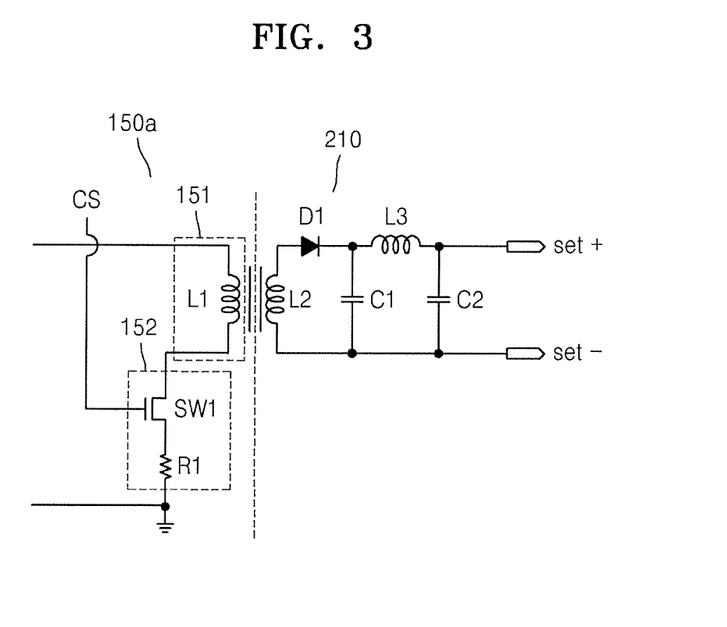
FIG. 3 is a circuit diagram of a non-contact discharging unit and a power receiving unit according to an embodiment of the present invention.

FIG. 3 is a circuit diagram of a non-contact discharging unit 150*a* and the power receiving unit 210 according to an embodiment of the present invention. Referring to FIG. 3, the non-contact discharging unit 150*a* includes a magnetic field generating unit 151 (for generating a magnetic field), a pulse generating unit 152 (for controlling an intensity of the magnetic field by pulse width modulation), and a transmission coil L1.

The pulse generating unit 152 includes a first switching device SW1 and a resistor R1. A first electrode of the first switching device SW1 is connected to a terminal of the transmission coil L1, and a second electrode thereof is connected to the resistor R1. A discharging switching signal is applied to a control electrode of the first switching device SW1 from the BMS 130 so that on/off operations of the first switching device SW1 are controlled. One terminal of the resistor R1 is connected to the second electrode of the first switching device SW1, and another terminal thereof is electrically connected to a negative terminal of the battery 110.

In the non-contact discharging unit 150*a* according to the present embodiment, a current flows through the transmission coil L1 when the first switching device SW1 is turned on according to the discharging switching signal applied to the first switching device SW1 from the BMS 130. The current is blocked when the first switching device SW1 is turned off. That is, a square wave current is generated according to the on/off operations of the first switching device SW1. Likewise, a magnetic field is generated in the transmission coil L1 by adjusting a magnitude of the current flowing through the transmission coil L1. In this regard, the discharging switching signal applied from the BMS 130 may be a pulse width modulation (PWM) signal. Duty ratios of the first switching device SW1 and a square wave may be adjusted by modulating a pulse width of the discharging switching signal, thereby adjusting a variation of the current flowing through the transmission coil L1 and an intensity of the magnetic field due to the variation.

Meanwhile, the power receiving unit 210 receives the power discharged by the non-contact discharging unit 150*a*. The power receiving unit 210 includes a receiving coil L2, first and second capacitors C1 and C2, and a third coil L3.

The receiving coil L2 induces a current from the magnetic field generated in the transmission coil L1. The current induced by the receiving coil L2 is an alternating current (AC). Thus, the current induced by the receiving coil L2 is refined by using a first diode D1 and a first capacitor C1. Filtering is performed on the refined current by using the third coil L3 and the second capacitor C2 to remove a high frequency component included in the refined current. The refined and filtered induction current is supplied to a main body through a set positive (set +) terminal and a set negative (set −) terminal.

Figure 4:
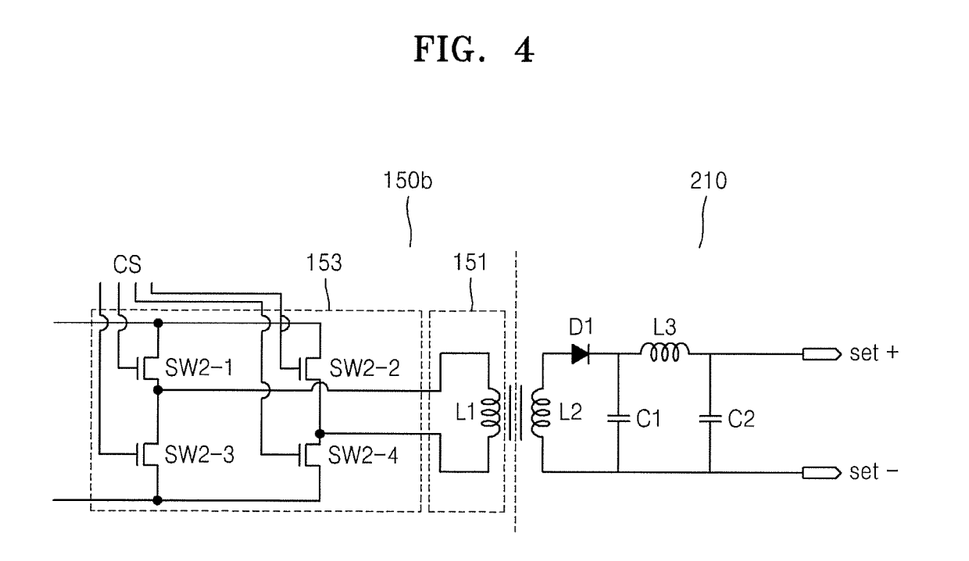
FIG. 4 is a circuit diagram of a non-contact discharging unit and a power receiving unit according to another embodiment of the present invention.

FIG. 4 is a circuit diagram of a non-contact discharging unit 150*b* and the power receiving unit 210 according to another embodiment of the present invention. Referring to FIG. 4, the non-contact discharging unit 150*b* includes the magnetic field generating unit 151 (for generating a magnetic field), an AC generating unit 153 (for controlling an intensity of the magnetic field by AC frequency modulation), and the transmission coil L1.

The AC generating unit 153 is an inverter for converting a direct current (DC) into an AC. Thus, the AC generating unit 153 includes a plurality of inverter switching devices SW2-1 through SW2-4. The BMS 130 applies discharging switching signals to control electrodes of the inverter switching devices SW2-1 through SW2-4 so that on/off operations of the inverter switching devices SW2-1 through SW2-4 are controlled.

In the non-contact discharging unit 150*b* according to the present embodiment of FIG. 4, the AC is generated according to control signals applied to the inverter switching devices SW2-1 through SW2-4 from the BMS 130 and thus, a magnetic field is generated in the transmission coil L1. In this regard, a frequency of the AC may be determined according to the discharging switching signals applied from the BMS 130, thereby adjusting a variation of a current flowing through the transmission coil L1 and an intensity of the magnetic field due to the variation.

Although a full-bridge inverter is shown as the AC generating unit 153 in FIG. 4, this is exemplary. In other embodiments, various inverter circuits such as a half-bridge inverter may be used as the AC generating unit 153.

Referring back to FIG. 2, the feedback receiving unit 160 detects a first feedback signal including voltage information from the main body 200, and applies a second feedback signal generated by detecting the first feedback signal to the BMS 130. The voltage information may be information regarding the voltage induced by the power receiving unit 210 that receives the power discharged by the non-contact discharging unit 150. If the BMS 130 determines from the second feedback signal applied from the feedback receiving unit 160 that the magnitude of the voltage induced by the power receiving unit 210 is greater than a first reference value, the BMS 130 controls the voltage in the power receiving unit 210 to be reduced by adjusting the discharging switching signal.

On the other hand, if the BMS 130 determines from the second feedback signal applied from the feedback receiving unit 160 that the magnitude of the voltage induced by the power receiving unit 210 is smaller than a second reference value, the BMS 130 controls the voltage in the power receiving unit 210 to increase by adjusting the discharging switching signal. The first reference value may be a maximum voltage allowed by the main body 200. The second reference value may be a minimum voltage necessary for operating the main body 200.

A feedback transmitting unit 220 measures a voltage of the power received by the power receiving unit 210, compares the measured voltage with the first reference value and the second reference value, and transmits a comparison result to the feedback receiving unit 160. The feedback transmitting unit 220 includes a feedback control unit 221 and a signal generating unit 222.

The feedback control unit 221 measures a voltage between output terminals of the power receiving unit 210, for example, a set positive (set +) terminal and a set negative (set −) terminal, and determines whether the measured voltage is greater than the first reference value or is smaller than the second reference value. The feedback control unit 221 generates a control signal for controlling the signal generating unit 222 according to a determination result and applies the control signal to the signal generating unit 222. The signal generating unit 222 generates a first feedback signal that can be received by the feedback receiving unit 160 according to the control signal of the feedback control unit 221 and transmits the voltage information.

Embodiments of the feedback receiving unit 160 and the feedback transmitting unit 220 will now be described in more detail below.

Figure 5:
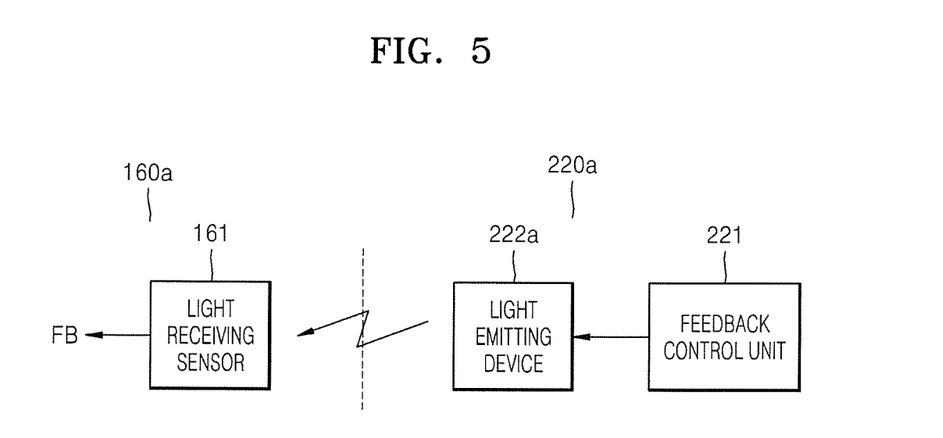
FIG. 5 is a block diagram illustrating a feedback receiving unit and a feedback transmitting unit according to an embodiment of the present invention.

FIG. 5 is a block diagram illustrating a feedback receiving unit 160a and a feedback transmitting unit 220a according to an embodiment of the present invention.

With respect to the feedback transmitting unit 220a, a light emitting device 222a is used as the signal generating unit 222. The feedback control unit 221 controls the light emitting device 222a to emit light according to a voltage measurement result and a comparison result of first and second reference values. For example, if the feedback control unit 221 determines that a measured voltage is between the first reference value and the second reference value, i.e., a normal voltage, the feedback control unit 221 controls the light emitting device 222a to emit light at a previously set frequency.

On the other hand, if the feedback control unit 221 determines that the measured voltage is greater than the first reference value, the feedback control unit 221 controls the light emitting device 222a to emit light at a frequency greater than the previously set frequency according to a magnitude of the measured voltage. Likewise, if the feedback control unit 221 determines that the measured voltage is smaller than the second reference value, the feedback control unit 221 controls the light emitting device 222a to emit light at a frequency smaller than the previously set frequency according to a magnitude of the measured voltage. However, this operation of the feedback control unit 221 is exemplary and the present invention is not limited thereto. For example, the feedback control unit 221 may perform a feedback operation by adjusting an intensity of light generated by the light emitting device 222a.

A light receiving unit (or light receiving sensor) 161 is used as the feedback receiving unit 160a. The feedback receiving unit 160a detects the light generated by the light emitting device 222a, generates a current or a voltage, and applies the generated current or voltage to the BMS 130 as a second feedback signal. When the feedback control unit 221 transmits a first feedback signal by using a light emitting frequency of the light emitting device 222a, the BMS 130 may adjust a discharging switching signal according to the frequency of the first feedback signal (as communicated to the BMS 130 through the second feedback signal). In other embodiments, when the feedback control unit 221 transmits a first feedback signal by adjusting an intensity of the light generated by the light emitting device 222a, the BMS 130 may adjust a discharging switching signal according to the intensity of the first feedback signal (as communicated to the BMS 130 though the second feedback signal).

Figure 6:
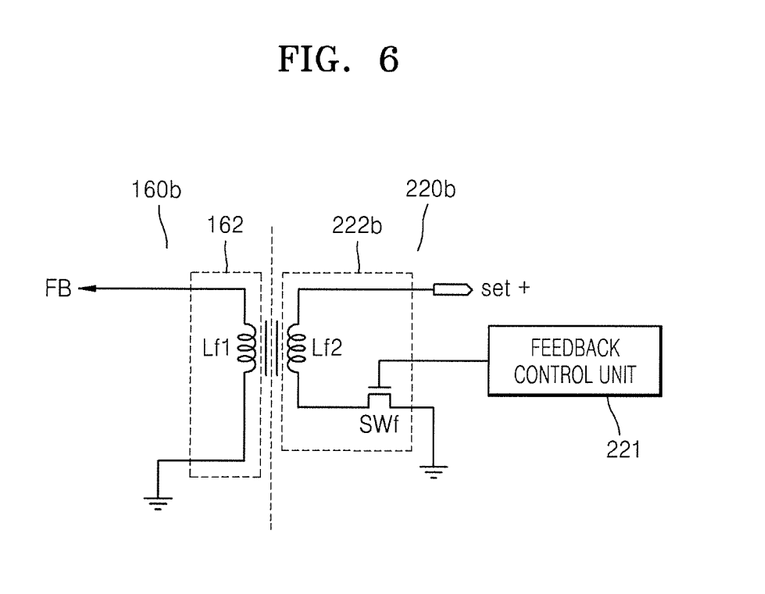
FIG. 6 is a circuit diagram of a feedback receiving unit and a feedback transmitting unit according to an embodiment of the present invention.

FIG. 6 is a circuit diagram of a feedback receiving unit 160b and a feedback transmitting unit 220b according to an embodiment of the present invention.

Referring to FIG. 6, with respect to the feedback transmitting unit 220b, a magnetic inducing unit 222b is used as the signal generating unit 222. The magnetic inducing unit 222b includes a second feedback coil Lf2 and a feedback switch SWf. On/off operations of the feedback switch SWf are controlled according to a signal of the feedback control unit 221, and a magnetic field is generated by changing a current flowing through the second feedback coil Lf2 according to the on/off operations of the feedback switch SWf.

The feedback control unit 221 controls the magnetic field to be generated in the magnetic field inducing unit 222b according to a voltage measurement result and a comparison result of first and second reference values. For example, if the feedback control unit 221 determines that a measured voltage is between the first reference value and the second reference value, i.e., a normal voltage, the feedback control unit 221 controls the magnetic field to vary at a previously set variation.

On the other hand, if the feedback control unit 221 determines that the measured voltage is greater than the first reference value, the feedback control unit 221 controls the magnetic field to have a variation greater than the previously set variation according to a magnitude of the measured voltage. Likewise, if the feedback control unit 221 determines that the measured voltage is smaller than the second reference value, the feedback control unit 221 controls the magnetic field to have a variation smaller than the previously set variation according to the magnitude of the measured voltage. However, this operation of the feedback control unit 221 is exemplary and the present invention is not limited thereto.

A current inducing unit 162 including the first feedback coil Lf1 is used as the feedback receiving unit 160b. The current inducing unit 162 induces a current having adjusted frequency and magnitude according to the variation of the magnetic field generated by the magnetic field inducing unit 222b. The feedback receiving unit 160b applies the current induced by the current inducing unit 162 to the BMS 130 as a second feedback signal. The BMS 130 adjusts a discharging switching signal according to a frequency or magnitude of the applied current.

Referring back to FIG. 2, the connection detecting unit 170 detects a connection between the battery pack 100a and the main body 200. The battery pack 100a according to the embodiments of the present invention performs non-contact discharging even though the battery pack 100a is not electrically connected to the main body 200 (e.g., not metal-to-metal contacted). Thus, to prevent discharging from being performed when the battery pack 100a is not connected to the main body 200, the battery pack 100a performs non-contact discharging only when the battery pack 100a is connected to the main body 200 by using the connection detecting unit 170 included therein. Various embodiments of the connection detecting unit 170 will now be described in more detail.

Figure 7:
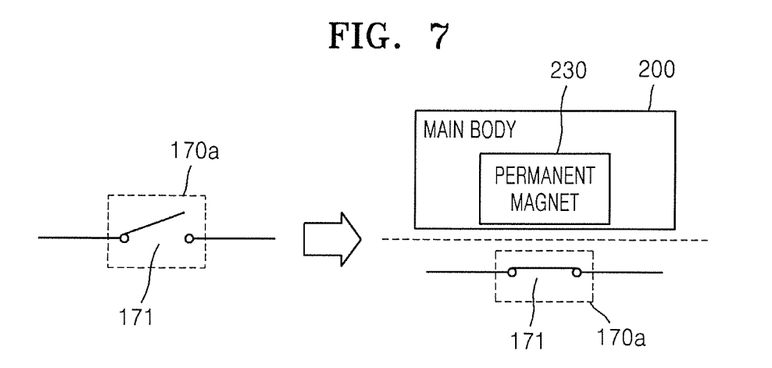
FIG. 7 illustrates a connection detecting unit according to an embodiment of the present invention.

FIG. 7 illustrates a connection detecting unit 170a according to an embodiment of the present invention.

Referring to FIG. 7, the connection detecting unit 170a includes a magnetic sensor 171. The main body 200 includes a magnetic substance, for example, a permanent magnet 230. As shown in FIG. 7, when the battery pack 100a is mounted in the main body 200, the permanent magnet 230 is installed facing the magnetic sensor 171.

When the magnetic sensor 171 does not detect a magnetic field nearby, the magnetic sensor 171 opens a discharge path of the battery pack 100a to block a current from flowing. Thus, the non-contact discharging unit 150 does not perform discharging. However, if the magnetic sensor 171 detects the magnetic field generated by the permanent magnet 230 when the battery pack 100a is mounted in the main body 200, the magnetic sensor 171 doses (engages) the discharge path to allow the current to flow, and thus the non-contact discharging unit 150 performs discharging.

Figure 8:
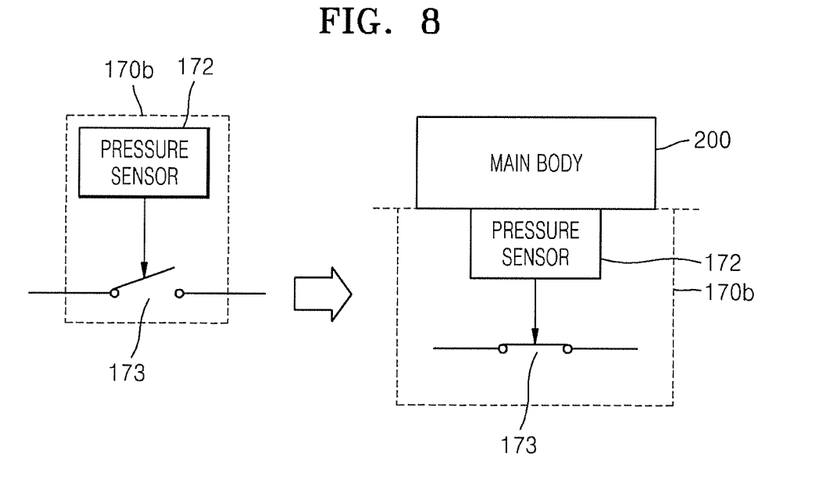
FIG. 8 illustrates a connection detecting unit according to another embodiment of the present invention.

FIG. 8 illustrates a connection detecting unit 170b according to another embodiment of the present invention.

Referring to FIG. 8, the connection detecting unit 170b includes a pressure sensor 172 and a second switching device 173. The pressure sensor 172 generates a signal for turning the second switching device 173 on when an external pressure is applied, and thus the second switching device 173 is turned on according to the signal.

In the present embodiment of FIG. 8, when the battery pack 100a is mounted in the main body 200, one surface of the battery pack 100a tightly contacts one surface of the main body 200. In this regard, the pressure sensor 172 is installed on one surface of the battery pack 100a that tightly contacts one surface of the main body 200. Thus, the pressure sensor 172 detects that the battery pack 100a is mounted in the main body 200. Accordingly, the pressure sensor 172 generates a signal to turn the second switching device 173 on only when the battery pack 100a is mounted in the main body 200 and thus, the non-contact discharging unit 150 may perform discharging.

Figure 9:
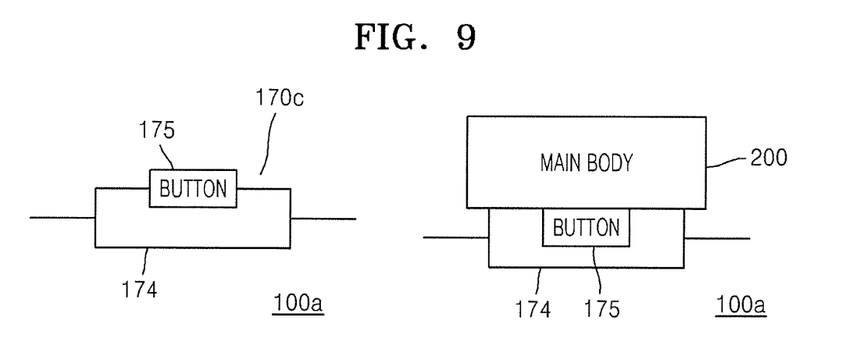
FIG. 9 illustrates a connection detecting unit according to another embodiment of the present invention.

FIG. 9 illustrates a connection detecting unit 170c according to another embodiment of the present invention.

Referring to FIG. 9, the connection detecting unit 170c includes a third switching device 174. The third switching device 174 includes a button 175. If the button 175 is pressed, the third switching device 174 is turned on.

In the present embodiment of FIG. 9, when the battery pack 100a is mounted in the main body 200, one surface of the battery pack 100a tightly contacts one surface of the main body 200. The third switching device 174 is installed so that the button 175 is positioned on one surface of the battery pack 100a that tightly contacts the one surface of the main body 200. Thus, if the battery pack 100a is mounted in the main body 200, since the button 175 of the third switching device 174 is pressed by the main body 200, the third switching device 174 detects that the battery pack 100a is mounted in the main body 200. Accordingly, under normal operation, the third switching device 174 is turned on only when battery pack 100a is mounted in the main body 200 and thus, the non-contact discharging unit 150 performs discharging.

Returning to FIG. 2, the main body 200 includes the power receiving unit 210 and the feedback transmitting unit 220, and receives electric power from the battery pack 100 in a non-contacting manner. That is, the main body 200 is electrically insulated from the battery pack 100a. The power receiving unit 210 and the feedback transmitting unit 220 were described above, and thus detailed descriptions are not repeated here.

As described above, the electronic device 1a including the battery pack 100a and the main body 200 according to the embodiment of FIG. 2 may discharge the power stored in the battery 110 to the main body 200 in a non-contacting manner. Thus, a discharging terminal is not externally exposed, thereby preventing or protecting the discharging terminal from being shorted.

Figure 10:
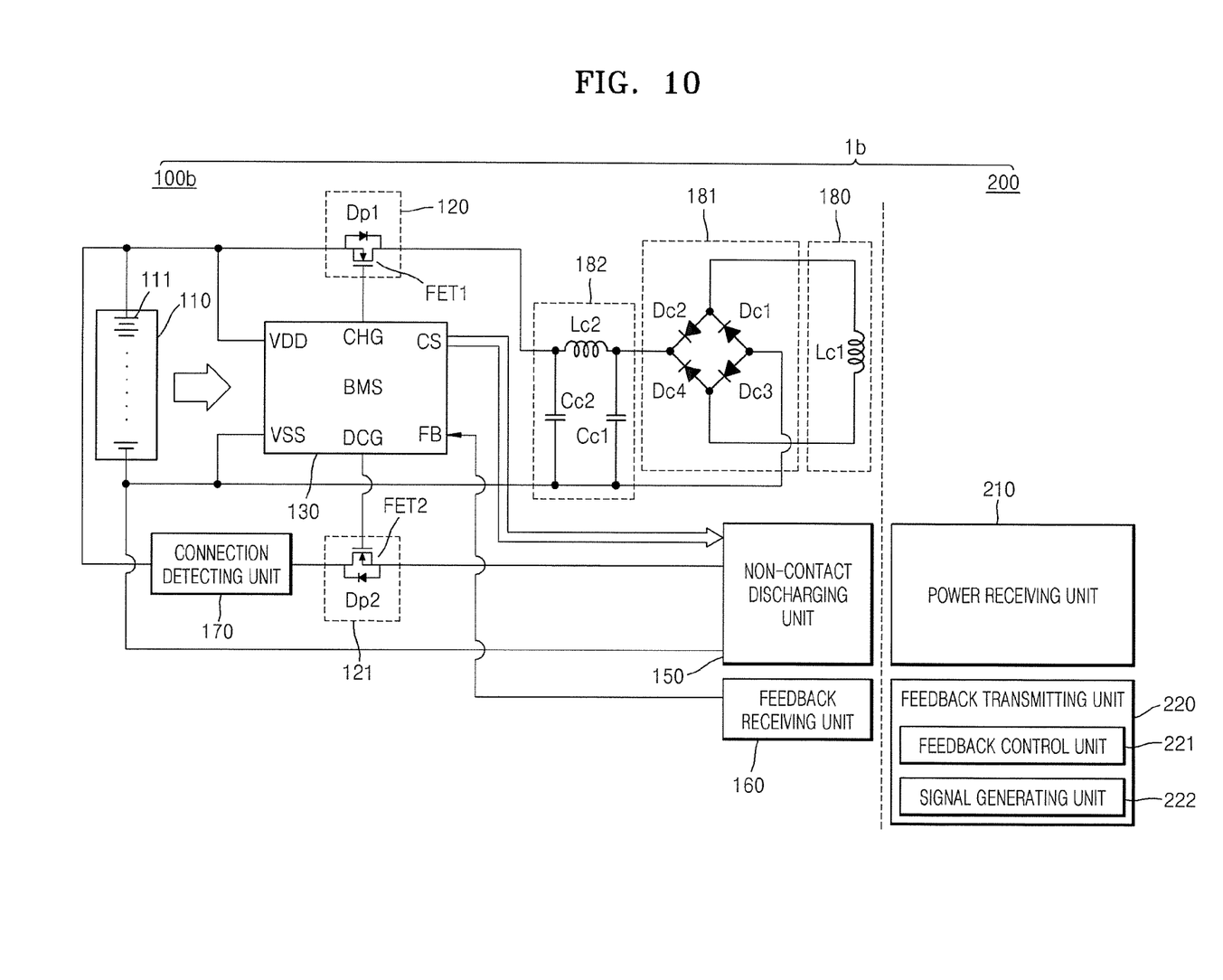
FIG. 10 is a circuit diagram of an electronic device according to another embodiment of the present invention.

FIG. 10 is a circuit diagram of an electronic device 1b according to another embodiment of the present invention. The electronic device 1b includes a battery pack 100b and the main body 200. The battery pack 100b of the present embodiment is similar to the battery pack 100a of FIG. 2, and thus, differences therebetween will be described below.

Referring to FIG. 10, the battery pack 100b includes a non-contact charging unit 180, a refining unit 181, and a filtering unit 182. The non-contact charging unit 180 includes a first charging coil Lc1. The first charging coil Lc1 is induced in proximity to a third charging coil Lc3 (refer to FIG. 11) included in a charging device 300. Accordingly, the first charging coil Lc1 detects a variation of a magnetic field generated when an AC is applied to the third charging coil Lc3, and generates an induction current.

The refining unit 181 refines the AC generated in the non-contact charging unit 180 and converts the refined AC into a DC. In the embodiment illustrated in FIG. 10, a diode bridge circuit including a plurality of refining diodes Dc1 through Dc4 is used as the refining unit 181. However, this is exemplary and the present invention is not limited thereto. In other embodiments, various refining circuits may be used as the refining unit 181.

As shown in FIG. 10, the filtering unit 182 is a π type filter including the second charging coil Lc2 and first and second charging capacitors Cc1 and Cc2. The filtering unit 182 filters a high frequency component from a current output from the refining unit 181, and maintains a constant output voltage. The battery 110 is charged according to the current output from the filtering unit 182.

Figure 11:
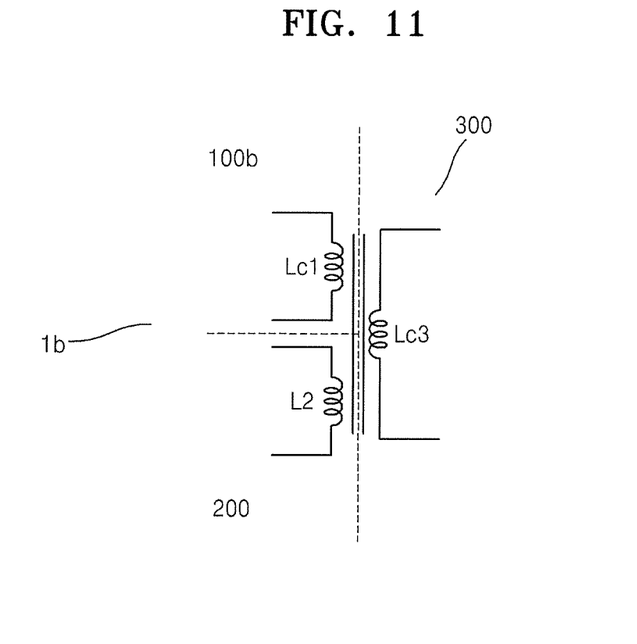
FIG. 11 illustrates a relationship between an electronic device and a charging device according to an embodiment of the present invention.

FIG. 11 illustrates a relationship between the electronic device 1b and the charging device 300 according to an embodiment of the present invention.

Referring to FIG. 11, the third charging coil Lc3 included in the charging device 300 may be concurrently (e.g., simultaneously) induced in proximity to the first charging coil Lc1 included in the battery pack 100b and in proximity to the receiving coil L2 included in the main body 200. Thus, the charging device 300 may be used to both (simultaneously) charge the battery pack 100b and operate the main body 200.

As described above, the electronic device 1b including the battery pack 100b and the main body 200 according to the present embodiment may discharge the electric power stored in the battery 110 to the main body 200 in a non-contacting manner. Further, the charging device 300 may be used to charge the battery pack 100b in a non-contacting manner. Thus, a discharging terminal is not externally exposed, thereby preventing or protecting the discharging terminal from being shorted. Further, the battery pack 100b is wholly sealed (that is, entirely electrically insulated), thereby preventing or protecting the battery pack 100b from being damaged even when the battery pack 100b is dropped into water.

Figure 12:
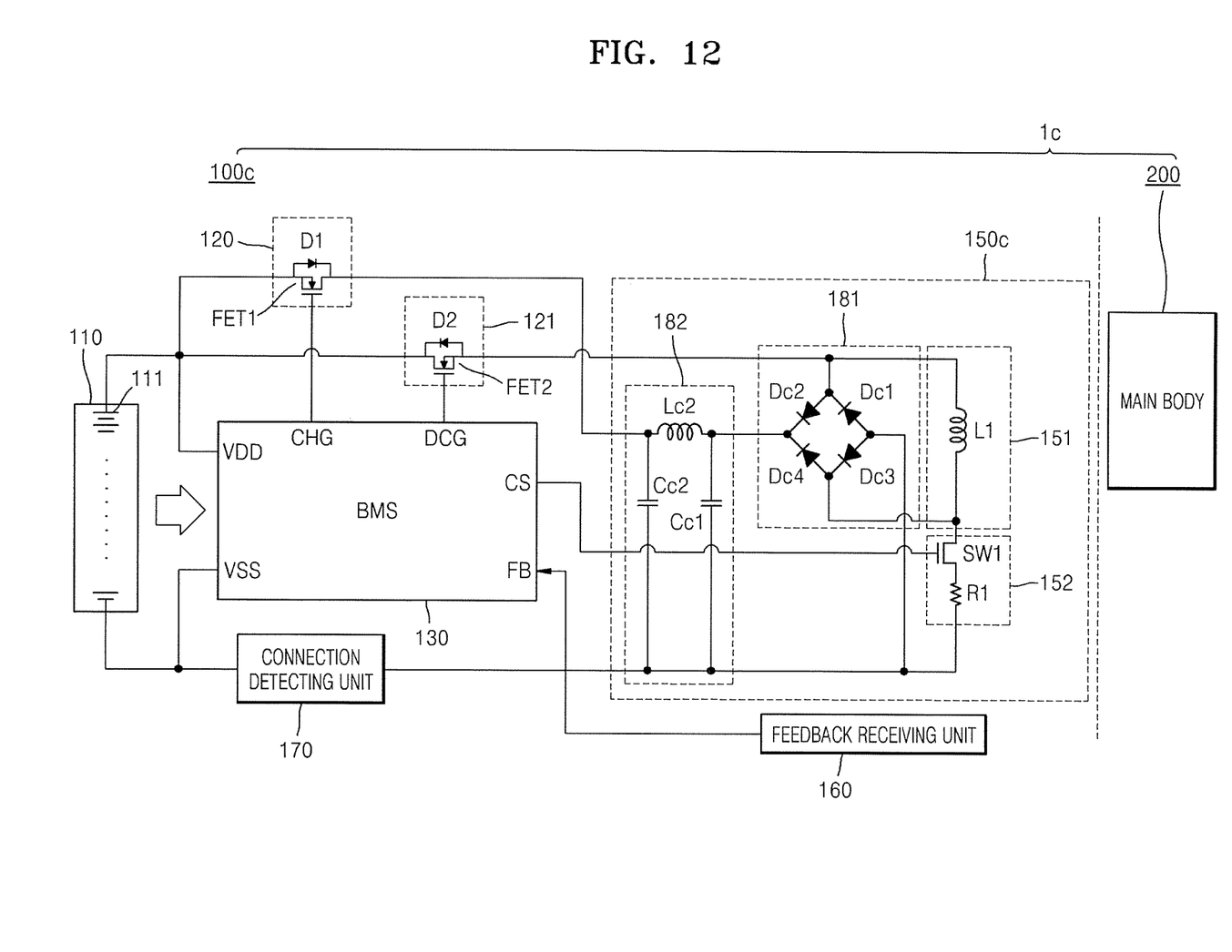
FIG. 12 is a circuit diagram of an electronic device according to another embodiment of the present invention.

FIG. 12 is a circuit diagram of an electronic device 1c according to another embodiment of the present invention.

Referring to FIG. 12, a battery pack 100c includes the battery 110, the charging control switch 120, the discharging control switch 121, the BMS 130, a non-contact discharging unit 150c, the feedback receiving unit 160, and the connection detecting unit 170. The construction of the non-contact discharging unit 150c is different from the constructions of the battery pack 100a and the battery pack 100b of FIGS. 1 and 10. The differences therebetween will now be described in more detail.

The non-contact discharging unit 150c of the present embodiment performs charging and discharging. The non-contact discharging unit 150c includes the magnetic field generating unit 151 (for generating a magnetic field and for inducing an electric current), the pulse generating unit 152 (for controlling an intensity of the magnetic field by pulse width modulation), the refining unit 181, and the filtering unit 182.

The non-contact discharging unit 150c includes the transmission coil L1. The pulse generating unit 152 includes the first switching device SW1 and the resistor R1. Non-contact discharging operations of the transmission coil L1 and the pulse generating unit 152 were described above, and thus descriptions thereof will not be repeated here.

In addition, the non-contact discharging unit 150c further includes the refining unit 181 and the filtering unit 182. When the battery pack 100c is in close proximity to the charging device 300, the transmission coil L1 detects a magnetic field generated by the charging device 300, and thus a current is induced to the transmission coil L1. The refining unit 181 refines the induced current. The filtering unit 182 filters and planarizes the refined current. The current output from the filtering unit 182 is applied to the battery 110 and thus, the non-contact discharging unit 150c performs a charging operation.

In the present embodiment of FIG. 12, charging and discharging operations are performed by using the transmission coil L1. Thus, during the charging operation, the discharging control switch 121 is turned off, and during the discharging operation, the charging control switch 120 is turned off.

Figure 13:
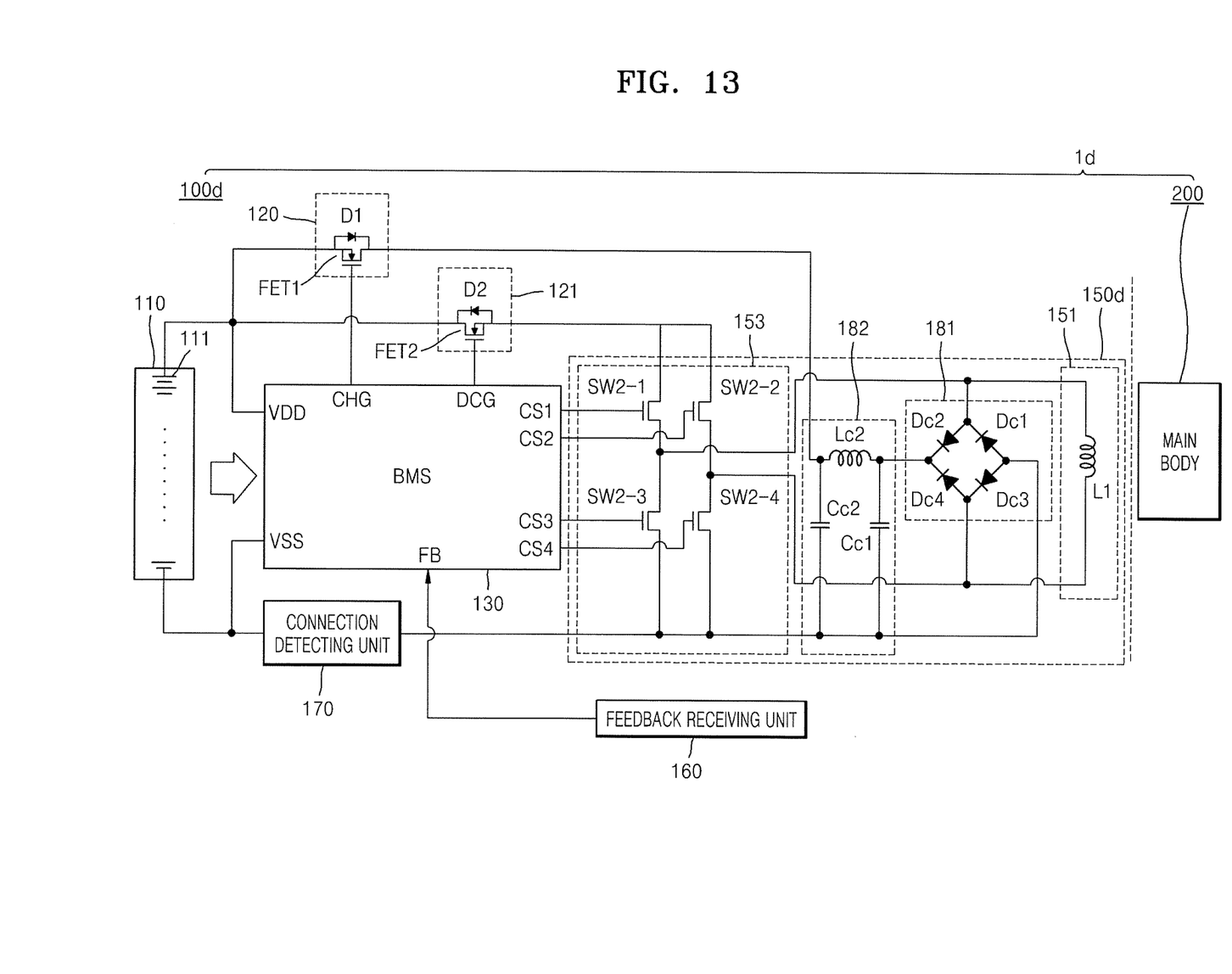
FIG. 13 is a circuit diagram of an electronic device according to another embodiment of the present invention.

FIG. 13 is a circuit diagram of an electronic device 1d according to another embodiment of the present invention.

Referring to FIG. 13, a battery pack 100d includes the battery 110, the charging control switch 120, the discharging control switch 121, the BMS 130, a non-contact discharging unit 150d, the feedback receiving unit 160, and the connection detecting unit 170. The construction of the non-contact discharging unit 150d is similar to the construction of the non-contact discharging unit 150c of FIG. 12, except that the non-contact discharging unit 150d includes the AC generating unit 153 (for controlling an intensity of the magnetic field by AC frequency modulation). The operation of the AC generating unit 153 was described with reference to FIG. 4, and thus a detailed description thereof will not be repeated here.

As described above, the electronic devices 1c and 1d including the battery packs 100c and 100d and the main body 200 discharge the electric power stored in the battery 110 to the main body 200 in a non-contacting manner. Further, the charging device 300 may be used to charge the battery packs 100c and 100d in a non-contacting manner. Thus, a discharging terminal is not externally exposed, thereby preventing or protecting the discharging terminal from being shorted. Further, the battery packs 100c and 100d are wholly sealed (i.e., electrically insulated), thereby preventing or protecting the battery packs 100c and 100d from being damaged even when the battery packs 100c and 100d are dropped into water. The non-contact discharging units 150c and 150d may perform non-contact charging and discharging, which simplifies a circuit construction.

While the present invention has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:

1. A battery pack for mounting to and supplying power to a main body of an electronic device, the battery pack comprising:
   a battery for storing electric energy;
   a non-contacting discharging unit for receiving the stored electric energy from the battery and for transferring the stored electric energy from the battery to a power receiving unit in the main body in a non-electrically contacting manner; and
   a feedback receiving unit for receiving feedback from a feedback transmitting unit in the main body in a non-electrically contacting manner, the feedback being for controlling a rate of transfer of the stored electric energy from the battery to the power receiving unit in the main body.

2. The battery pack of claim 1, wherein the feedback receiving unit comprises a light receiving sensor or a current inducing unit.

3. The battery pack of claim 1, further comprising a connection detecting unit for detecting a connection between the non-contacting discharging unit and the power receiving unit.

4. The battery pack of claim 3, wherein the connection detecting unit comprises a magnetic sensor, a pressure sensor, or a button.

5. The battery pack of claim 1, wherein the non-contacting discharging unit comprises a magnetic field generating unit for generating a magnetic field.

6. The battery pack of claim 5, wherein the non-contacting discharging unit further comprises a pulse generating unit for controlling an intensity of the magnetic field by pulse width modulation.

7. The battery pack of claim 5, wherein the non-contacting discharging unit further comprises an alternating current (AC) generating unit for controlling an intensity of the magnetic field by AC frequency modulation.

8. The battery pack of claim 5, wherein
   the non-contacting discharging unit is further configured to transfer electric energy from a charging device to the battery, and
   the magnetic field generating unit is further configured to receive the electric energy from the charging device in a non-electrically contacting manner.

9. The battery pack of claim 8, wherein
   the non-contacting discharging unit further comprises a refining unit and a filtering unit,
   the magnetic field generating unit is further configured to induce an electric current,
   the refining unit is configured to refine the induced current, and
   the filtering unit is configured to filter the refined current and charge the battery with the filtered current.

10. The battery pack of claim 1, further comprising a non-contacting charging unit for transferring electric energy from a charging device to the battery, wherein the non-contacting charging unit is configured to receive the electric energy from the charging device in a non-electrically contacting manner.

11. The battery pack of claim 10, further comprising a refining unit and a filtering unit, wherein
the non-contacting charging unit is configured to generate an alternating current,
the refining unit is configured to refine the alternating current and convert the refined alternating current to a direct current, and
the filtering unit is configured to filter the direct current and charge the battery with the filtered direct current.

12. The battery pack of claim 1, wherein the battery pack is electrically insulated from the power receiving unit when the battery pack is configured to transfer the stored electric energy to the power receiving unit.

13. An electronic device comprising:
a main body comprising:
a power receiving unit; and
a feedback transmitting unit; and
a battery pack for mounting to and supplying power to the main body, the battery pack comprising:
a battery for storing electric energy;
a non-contacting discharging unit for receiving the stored electric energy from the battery and transferring the stored electric energy from the battery to the power receiving unit in the main body in a non-electrically contacting manner; and
a feedback receiving unit for receiving feedback from the feedback transmitting unit in the main body in a non-electrically contacting manner, the feedback being for controlling a rate of transfer of the stored electric energy from the battery to the power receiving unit in the main body.

14. The electronic device of claim 13, wherein the battery pack further comprises a connection detecting unit for detecting a mounting of the battery pack to the main body.

15. The electronic device of claim 13, wherein
the battery pack further comprises a non-contacting charging unit for transferring electric energy from a charging device to the battery,
the non-contacting charging unit is configured to receive the electric energy from the charging device in a non-electrically contacting manner, and
the power receiving unit is configured to receive the electric energy from the charging device in a non-electrically contacting manner to power the main body.

16. The electronic device of claim 13, wherein the non-contacting discharging unit is further configured
to receive electric energy from a charging device in a non-electrically contacting manner, and
to transfer the electric energy from the charging device to the battery.

* * * * *